United States Patent [19]

Shelton

[11] 4,144,698
[45] Mar. 20, 1979

[54] STUBBLE FLATTENER ATTACHMENT

[75] Inventor: George E. Shelton, Sullivan, Ill.

[73] Assignee: Lloyd Younger, Bethany, Ill. ; a part interest

[21] Appl. No.: 758,167

[22] Filed: Jan. 10, 1977

[51] Int. Cl.² ............................................. A01D 45/02
[52] U.S. Cl. ................................................ 56/1; 51/53
[58] Field of Search ..................... 56/1, 51, 52, 53, 98, 56/105, 106, 15.8, 15.9, 14.3, 14.4, 17.5

[56] References Cited

U.S. PATENT DOCUMENTS

| | | | |
|---|---|---|---|
| 1,520,558 | 12/1924 | Brown | 56/14.4 |
| 2,465,488 | 3/1949 | Sears et al. | 172/39 |
| 2,504,459 | 4/1950 | Schneider et al. | 56/330 |
| 2,664,692 | 1/1954 | Darlington | 56/330 |
| 3,702,051 | 11/1972 | Deines | 56/15.9 X |

Primary Examiner—Russell R. Kinsey
Attorney, Agent, or Firm—Julian Caplan

[57] ABSTRACT

A pair of arms are pivotably affixed at their upper ends to a shaft secured to brackets depending from the underside of a combine header or other agricultural machinery, the arms being disposed at an angle of about 45° with the ground. A roller is secured across the lower ends of the arms, the roller having a width slightly greater than the width of the row of the crop to be harvested. The entire assembly is connected to a plate which may be welded or otherwise secured to the machine ahead of the tires. A compression spring is affixed at its upper end to the plate and at its lower end to a cross-piece secured across the arms at about their midpoint, the spring urging the roller against the ground so that the stubble will be forced substantially flat against the ground as the large tires of the combine pass over it. The considerable damage to such tires which otherwise occurs from stubble wearing the tread is eliminated or reduced.

6 Claims, 4 Drawing Figures

STUBBLE FLATTENER ATTACHMENT

BACKGROUND OF THE INVENTION

This invention relates to an attachment to the header of a combine for flattening stubble in advance of the large tires of the combine or other agricultural machinery.

In harvesting beans, corn, and similar rough-fibered crops, a stubble of from about 2 to 4 inches high is continuously produced following the harvesting operation of the combine header. Typical combines have large rubber tires which are located immediately behind the header and which are subject to being damaged from the spike-like stubble. Such combine tires tend to wear out at a rapid rate due to continually running on the cut-off rows of crops. Since each tire represents a significant expense, various means have been tried to avoid damage from the stubble and to eliminate frequent replacement of the tires. One such attempt has involved steel slides mounted on the underneath sides of the front end of the combine header. However, the slides have not proven effective, as they tend to pick up dirt, leaves and stems, particularly if the soil is the least bit wet.

Cranberry harvesters such as those disclosed in U.S. Pat. Nos. 2,607,180 to Stankavich and 2,504,459 to Schneider have employed rollers which hold down cranberry vines as the berries are caught between the harvesting bars. The rollers of such machinery are designed to hold the vines down lest they be pulled from the soil and for such purpose are so constructed that they rise and fall as the harvester moves along. That is, such rollers are not designed and could not be used to flatten stubble in the path of large combine tires.

SUMMARY OF THE INVENTION

A stubble flattener comprising a pair of arms pivotably affixed to a combine header, a roller secured at the lower ends of the arms, and a compression spring urging the roller against the ground is provided for attachment to the underside of a combine header in the path of the large rubber tires thereof, to force stubble substantially flat against the ground as the large tires pass over it. Preferably, the upper ends of the pair of arms are slideably attached to a shaft by means of screw-tightened collars or the like so that the position of the roller can be adjusted relative to the large tire by moving the arms laterally along the shaft.

It is a primary object of this invention to provide an inexpensive and yet efficient means for flattening stubble in the path of the large rubber tires of a combine, so as to prevent damage to such tires from the spike-like contact of the stubble against the tires.

It is another object of this invention to provide a stubble flattener which can be permanently or removably attached to the underside of a combine header.

It is a further object of this invention to provide a pair of stubble flatteners slideably secured to a shaft at the upper ends of their arms so that they can be moved laterally with respect to each other and the large rubber combine tires.

Other objects of the present invention will become apparent upon reading the following specification and referring to the accompanying drawings in which similar characters of reference represent corresponding parts in each of the several views.

DESCRIPTION OF THE PREFERRED EMBODIMENT

Figure 1:
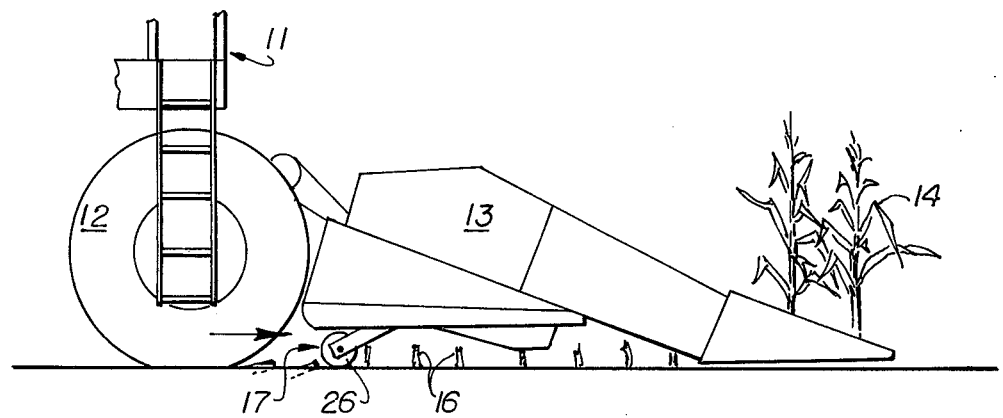
FIG. 1 is a partial side elevational view showing the stubble flattener of this invention in place on a combine.

Referring to FIG. 1, combine 11 has a pair of large rubber tires 12 mounted behind the header 13 which cuts the standing crop 14 to produce stubble 16. Although the crop shown being harvested is corn, it is understood that similar rough-fibered crops, such as beans, will also produce a hard, spike-like stubble that could damage the large tires of the combine. The stubble flattener 17, shown in operating position ahead of tire 12, can be utilized for flattening any of such stubble.

Figure 2:
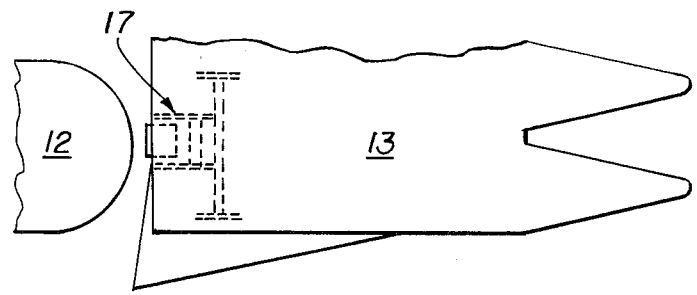
FIG. 2 is a partial top plan view of the combine showing the stubble flattener in section.

As shown in FIG. 2, a single stubble flattener 17 (shown in dotted lines) is secured to the underside of the header 13 directly in line with large rubber tire 12. Similarly, a stubble flattener is secured in front of the opposite wheel, not shown. As will be described below, each of the stubble flatteners may be slideably disposed on the header for lateral movement so that its position can be adjusted relative to the other and to the large rubber tires 12.

Figure 3:
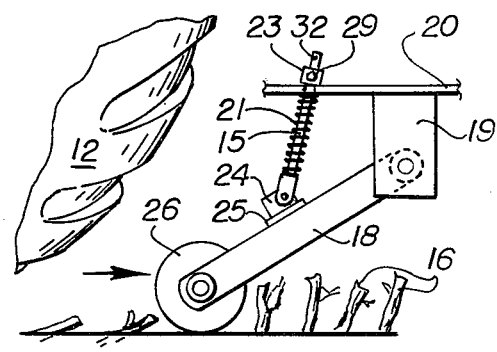
FIG. 3 is an enlarged fragmentary view showing stubble being flattened in advance of a large rubber combine tire.

The stubble flattener 17 comprises a pair of arms 18 pivotably attached to a shaft 22 which in turn is secured by depending brackets 19 to the underside of plate 20 which may be secured to the header 13 in proper position, as by welding. A roller 26 is affixed across the lower ends of the arms 18, the arms being disposed at about a 45° angle with the ground and the roller being urged against the ground by compression spring 21 and rod 15 disposed within the spring. As shown in FIG. 3, the action of the roller substantially flattens the stubble 16 ahead of the large rubber tire 12 of the combine.

The rod 15 and compression spring 21 are held in position on plate 20 by cotter key 32, bushing 23 and set screw 29, and are secured at their lower ends to bracket 24 on crosspiece 25. The rod 15 works inside the spring 21, and can be used to raise the roller completely clear of the ground, or to exert sufficient downward pressure on the roller to flatten the stubble rows. The crosspiece 25 is secured across the arms 18 at about their midpoints. The spring 21 and rod 15 are adjustable by means of bushing 23 and set screw 29 such that the flattening pressure of the roller can be readily increased or decreased.

Figure 4:
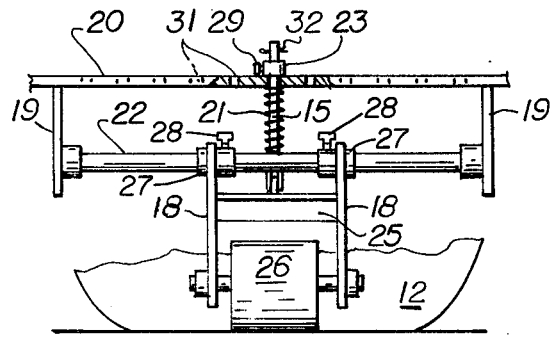
FIG. 4 is a broken away front view showing the positioning of the stubble flattener with respect to the large combine tire.

As shown in FIG. 4, the roller 26 is positioned directly in line with the large rubber tire 12, the roller 26 having a width slightly greater than that of the row of stubble over which the large rubber tires passes. The arms 18 are slideably as well as pivotally attached to the shaft 22 by means of collars 27 and set screws 28, the shaft itself being of about the same width as the large rubber tire so that when the compression spring 21 and rod 15 are temporarily disconnected, the arms 18 can be slid laterally to the left or the right to adjust the position of the roller 26 with respect to the rubber tire 12. Holes 31 are spaced evenly along the upper surface of plate 20 to accommodate different lateral settings of the roller. The cotter key 32 can be readily removed and rod 15 moved to another hole 31, as required. Accordingly, the roller 26 can be positioned to flatten stubble in the path of the tire 12 no matter where the rows contact the tire. The rear wheels of a typical combine are much smaller than the large front wheels and usually run between the rows, where they are not subject to damage from the stubble.

Preferably, the roller 26 has a width of about 6 inches and a diameter of about 10 inches. The roller 26 can be a roller bearing wheel constructed of steel, with the arms, shaft, plate, and crosspiece also being so constructed, to provide an inexpensive and long-lasting attachment to combine headers.

Although the foregoing invention has been described in some detail, by way of illustration and example for purposes of clarity and understanding, it is understood that certain changes and modifications may be practiced within the spirit of the invention and scope of the appended claims.

What is claimed is:

1. A stubble flattener for attachment to the header of a combine comprising a ground wheel for said header and a pneumatic tire subject to damage by stubble, a plate adapted to be fastened to a header, a pair of arms pivotally mounted at their upper ends relative to the plate, a roller secured to the lower ends of the arms immediately in front of said tire and substantially as wide as said tire, the roller being disposed so that it runs along the ground to flatten stubble so that it does not injure said tire, and a compression spring disposed between the plate and the arms for urging the roller against the ground to flatten stubble.

2. The stubble flattener of claim 1 which further comprises a shaft, said arms being pivotably and slideably attached at their upper ends to said shaft, brackets depending from the underside of the plate, said shaft being pivotally received in said brackets, the shaft being approximately as wide as a large rubber combine tire, and wherein the compression spring can be moved laterally along the plate, so that the arms and spring can be slid laterally along the shaft to adjust the position of the roller relative to the large rubber tire of the combine.

3. The stubble flattener of claim 2 additionally comprising a rod slideably secured within the compression spring, the rod and spring being held at a desired setting by means of a bushing and set screw.

4. The stubble flattener of claim 3 wherein holes are located laterally across the plate for receiving the upper end of the slideable rod, each hole allowing a different lateral positioning of the roller.

5. The stubble flattener of claim 1 wherein a crosspiece is affixed across the arms at about their midpoints, the crosspiece having a bracket disposed thereon for attachment to the lower end of the compression spring.

6. The stubble flattener of claim 1 wherein the roller is a roller bearing wheel constructed of steel, and has a width of about 6 inches and a diameter of about 10 inches.

* * * * *